United States Patent
Peters et al.

(10) Patent No.: US 9,049,403 B2
(45) Date of Patent: Jun. 2, 2015

(54) METHOD AND APPARATUS FOR HIGH QUALITY PRINTING OF NON-SATURATED COLORED TEXT AND LINES

(71) Applicant: ELECTRONICS FOR IMAGING, INC., Foster City, CA (US)

(72) Inventors: Michael Peters, Foster City, CA (US); Leon Williams, Walworth, NY (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 13/753,446

(22) Filed: Jan. 29, 2013

(65) Prior Publication Data

US 2014/0211267 A1 Jul. 31, 2014

(51) Int. Cl.
*H04N 1/407* (2006.01)
*H04N 1/58* (2006.01)
*H04N 1/52* (2006.01)

(52) U.S. Cl.
CPC ... *H04N 1/58* (2013.01); *H04N 1/52* (2013.01)

(58) Field of Classification Search
None
See application file for complete search history.

(56) References Cited

U.S. PATENT DOCUMENTS

| | | | | |
|---|---|---|---|---|
| 5,475,507 A * | 12/1995 | Suzuki et al. | | 358/500 |
| 7,079,287 B1 * | 7/2006 | Ng et al. | | 358/2.1 |
| 7,411,612 B2 * | 8/2008 | Yamada et al. | | 348/222.1 |
| 7,450,137 B2 * | 11/2008 | Deng et al. | | 345/629 |
| 7,477,289 B2 * | 1/2009 | Kondo et al. | | 348/208.4 |
| 8,098,948 B1 * | 1/2012 | Tzur et al. | | 382/255 |
| 2006/0187234 A1 * | 8/2006 | Deng et al. | | 345/592 |
| 2007/0052845 A1 * | 3/2007 | Adams | | 348/452 |
| 2011/0141525 A1 * | 6/2011 | Ng et al. | | 358/3.06 |
| 2013/0027752 A1 * | 1/2013 | Park et al. | | 358/3.06 |
| 2014/0132617 A1 * | 5/2014 | Bhattacharyay et al. | | 345/582 |

* cited by examiner

*Primary Examiner* — Dung Tran
(74) *Attorney, Agent, or Firm* — Michael A. Glenn; Perkins Coie LLP

(57) ABSTRACT

An embodiment implements a methodology for printing non-saturated text and lines in a way that removes the jagged edge problem. An embodiment uses a combination of two screens, e.g. AM screening and applying pure color. For example, according to the embodiment, the closer to the edge from the interior of text or lines, the less amplitude modulation half toning is applied and the more actual color or contone is applied. A particular algorithm for determining and using a blending parameter is provided.

18 Claims, 4 Drawing Sheets

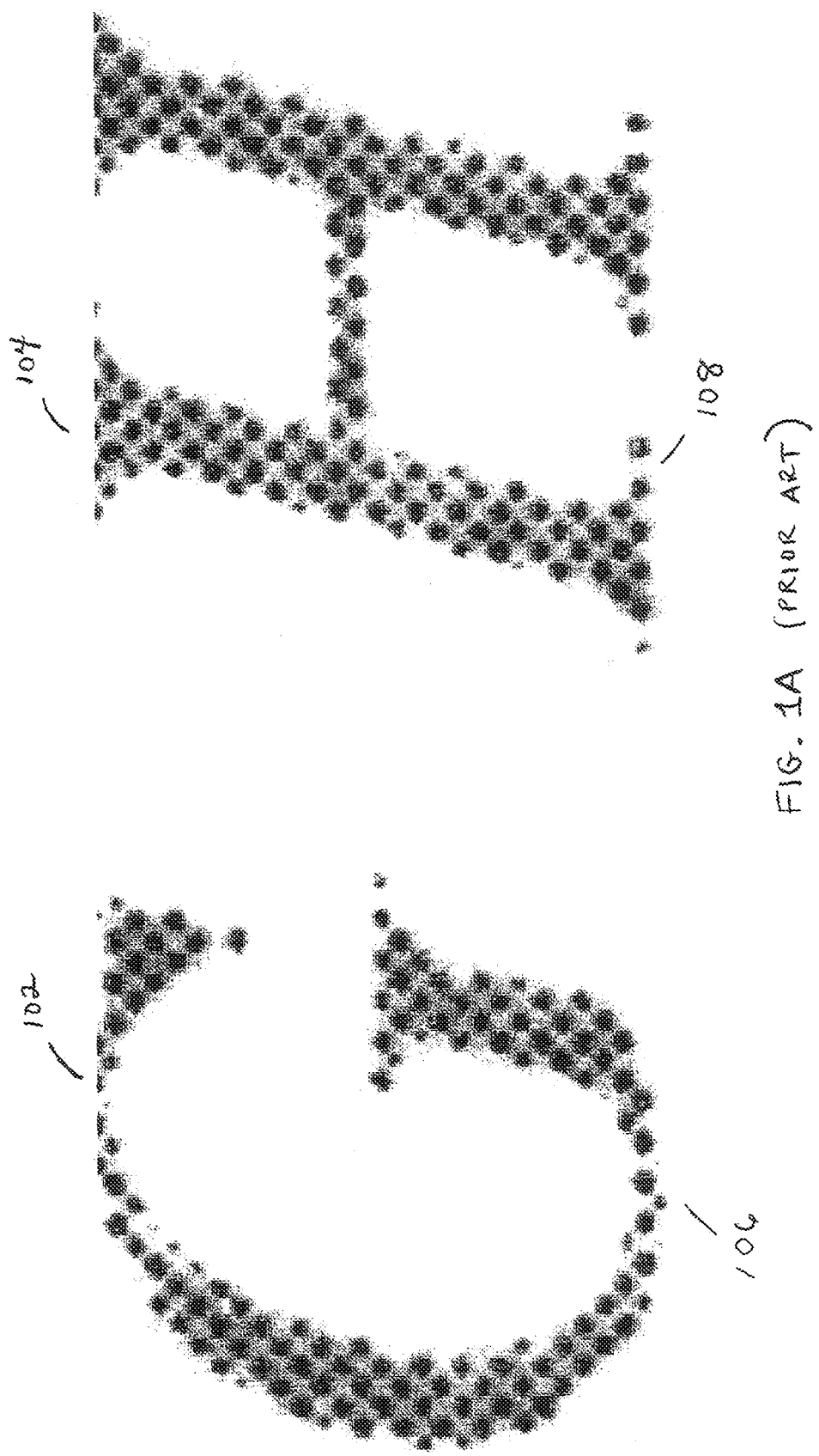

METHOD AND APPARATUS FOR HIGH QUALITY PRINTING OF NON-SATURATED COLORED TEXT AND LINES

BACKGROUND OF THE INVENTION

1. Technical Field

This invention relates generally to the field of electrophotographic printing. More specifically, this invention relates to improving the print quality of non-saturated colored text and lines in eletrophotographic printing processes.

2. Description of the Related Art

In the context of electrophotographic printing, the current process for rendering text or graphics that are not one hundred percent saturated (non-saturated) is through conventional half-tone screening techniques. For the purposes of discussion herein, saturation refers to 100% area coverage in a given region of the printer's primary colorants: Cyan, Magenta, Yellow and/or Black (CMYK). Also, for the purposes of discussion herein, half-toning may be defined as a pattern of dots or as a process that achieves a perceived continuous tone imager through the use of dots, varying either in size, in shape or in spacing. One common technique of half-toning is amplitude modulation screening ("AM screening"). For the purposes of discussion herein, AM screening may be described as a process by which the size of a given dot varies, reflecting the density of the object that it represents and by which the dots are placed in a grid.

Examples of AM screening techniques employ dot screens and line screens, where the increase in darkness is achieved by adding more ink to some spots or some lines on the given piece of paper. AM screening may behave as though a sine wave is propagating through the target area, where the intensity or other characteristic goes up and down. However, it should be appreciated that on average, the human eye perceives the right color, the color that is meant to be conveyed.

While electrophotographic printing of non-saturated colors may render the intended color, at least to the human eye, it has been found that electrophotographic printing of non-saturated colors using AM screening may also lead to jagged edges of text and lines. Thus, it would be desirable that, when printing text or lines in non-saturated colors on electrophotographic printers, the printing process does not render jagged edges for the printed text or lines.

SUMMARY OF THE INVENTION

An embodiment implements a methodology for printing non-saturated text and lines in a way that removes the jagged edge problem. An embodiment uses a combination of two screens, e.g. AM screening and applying pure color. For example, according to the embodiment, the closer to the edge from the interior of text or lines, the less amplitude modulation half toning is applied and the more actual color or contone is applied. A particular algorithm for determining and using a blending parameter is provided.

BRIEF DESCRIPTION OF THE DRAWINGS

FIG. 1A is a sample output from printing two non-saturated color letters, G and H, in plain half-toning, according to the prior art;

DETAILED DESCRIPTION OF THE INVENTION

Jagged Edge Problem

Figure 1B:
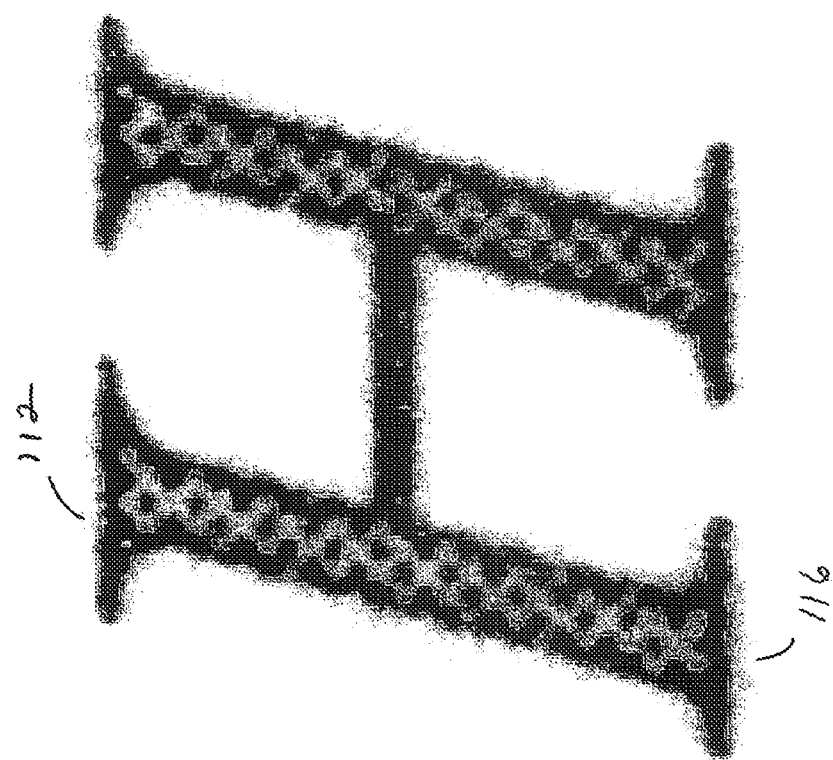
FIG. 1B is a sample output of printing two non-saturated color letters, G and H, in half-toning with edge enhancement, according to an embodiment.
Figure 1B:
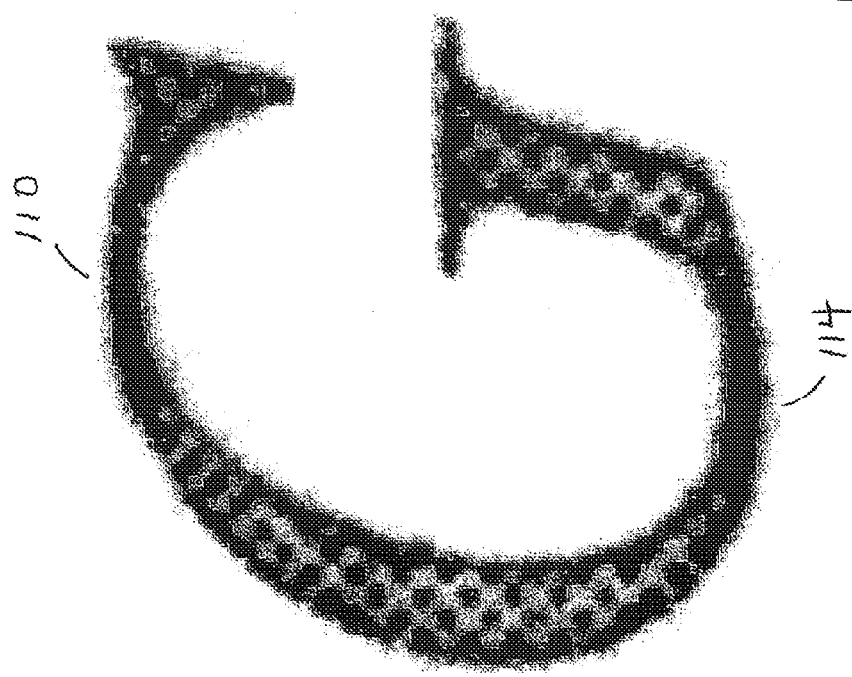

As mentioned hereinabove, while electrophotographic printing of not-saturated colors may render the intended color, at least to the human eye, it has been found that electrophotographic printing of not-saturated colors may also lead to jagged edges of text and lines. For example, where a user would like to have a nice sharp line, such line may be jagged because, as may be expected with a half-toning process, some dots are rendered on and some off and then on and off, etc. Thus, while the human eye would like to perceive a sharp contour, current processes do not render that.

The Methodology

An embodiment implements a methodology for printing non-saturated text and lines in a way that removes the jagged edge problem. An embodiment uses a combination of two screens, e.g. AM screening and applying pure color. According to the embodiment, the closer to the edge from the interior of text or lines, the less amplitude modulation half toning is applied and the more actual color or contone is applied. For the purposes of discussion herein, contone, which may be considered to be "continuous tone," may be referred to as a process, by which the dot sizes are varied to simulate a continuous tonal effect.

It should be appreciated that the process does not provide the contone or color requested all along, because, in electrophotographic printing, providing or rendering substantially only contone has been found not to be stable. That is, the result is not a stable, even result.

For example, when a printer sends a contone value, such as the zero to four or zero to 16, for example, typically, the printer internally turns this value into a laser pulse width modulation. The laser pulse width modulation is then used in the electrophotography system to discharge a photo receptor and collect toner.

Thus, in accordance with an embodiment, the system is actually switching from the amplitude modulation screening method in the interior to more of a direct pulse width modulation that pulses within a pixel, which results in a crisp edge. As mentioned hereinabove, such direct pulse width modulation may not be stable. However, it has been found that in some circumstances stability may not be as important as obtaining the crisp edge.

Thus, it should be appreciated that in accordance with an embodiment, just a small area, i.e. close to the edge, is considered. It is has been found that at or close to the edge, the larger perceived problem is not the stability, but, rather, the jaggedness of the edge. Put another way, the resolution that one would like to get to represent a sharp edge is lost with half-toning, while amplitude modulation works well for printing on a larger constant area.

Thus, in an embodiment, the process includes measuring how close the printing is to an edge. For example, the embodiment determines how, at a particular pixel within text or line, close the process is from the edge, e.g. from the background color.

Blending Parameter

In an embodiment, a particular distance, D, from the edge is predetermined. Further, the embodiment provides a range from D-minimum ("$D_{MIN}$") to D-maximum ("$D_{MAX}$"). $D_{MIN}$ is at one end of the distance and $D_{MAX}$ is at the opposite end of the distance. Further, the embodiment provides a parameter that at $D_{MIN}$ is zero and at $D_{MAX}$ is one (or vice-versa if one skilled in the art desires the opposite polarity). Thus, such parameter may be referred to as a blending parameter that ranges from zero to one, i.e. may take on any value between zero and one. For purposes of discussion herein, such blending parameter may be referred to as alpha or "$\alpha$".

For example, if the printing process is at $\alpha$=one, then the process is greater than or equal to $D_{MAX}$ from the edge. Thus, the process just does the normal half toning. If the process is at $\alpha$ equals zero, then the embodiment performs the amplitude modulation screening but without the amplitude, i.e. with a sine wave that doesn't go up and down.

Handling Available Levels

Typically, a user directly or indirectly tries to represent eight bits of color information, which may be 256 different levels of color. As well, the printer typically does not have available the many levels that may be desired to print at a particular pixel. Thus, in accordance with an embodiment, approximations to levels are applied. As well, for the purposes of discussion herein, it is assumed that the printers which are considered have more than two levels of color but less than 256 levels of color that they can represent.

For example, if a user asks for halfway in between, essentially the user is asking for level 128. In the case where the printer may print only four levels: zero, one, two, three or four, then, is it reasonable to assume that the user would like to see the printer represent a level between level two and level three, i.e. halfway in between level two and level three.

Thus, an embodiment provides a level of color which is a variation between level two and level three. According to prior art techniques, such techniques perform normal AM screening on the interior of, for example, the text, which renders most of the color values to be either zero or three. Prior art techniques have fewer intermediate values available.

In contrast, an embodiment provides a closer approximation to what was asked for on the edge. Put another way, an embodiment makes a small adjustment to the edge value to boost it a little bit because partial values are desired. It has been found that, in accordance with the prior art, if the color levels are low, such color levels may not be represented on the paper and, in accordance with the instant techniques, are boosted.

It should be appreciated that the amount of boosting of color values may depend on neighboring values, as well. If such boosting is applied to areas very near an AM dot, a particular boost may appear overly boosted while the same boost applied to an area further from the AM dot may appear under-boosted. Thus, in an embodiment, the boost is adjusted based on the proximity to the particular AM dot.

Visual Effect

In accordance with an embodiment, a user might see that in the interior of content, e.g. text, a pattern of dots, e.g. of several pixels on and then some off and then on and so forth. Then, as the user's focus goes towards the edge, the effect becomes more and more of the contone effect. That is, the dots go away and are replaced with a constant toner value on the edge.

An Example—$D_{MAX}$ is Three Pixels

An embodiment may be understood by the following example. Suppose $D_{MAX}$ is three pixels. Further suppose that the process is at one and a half pixels from or to the edge. Then, in accordance with an embodiment, the value that is generated by the system, which is the value that represents the output color value, is generated as follows. The process takes half the value that would have been achieved by the half-tone technique, i.e. with the AM screen, and half of the contone value or as close to it as can be represented with, for instance, the pulse width modulation. Then, the system or process averages such two values together.

It should be appreciated that instead of the process being at the half-way point within the range, D, that the process could be at any other point, such as for example, three-quarters of the way to the edge or one-quarter of the distance, D, from the edge. In this example, in accordance with an embodiment, the process would take one quarter of the value that would have been achieved by the half-tone technique, i.e. with the AM screen, and three-quarters of the contone value or as close to it as can be represented with, for instance, the pulse width modulation. Then, the system or process combines such two values together.

It should be appreciated that in an embodiment, the transition from all AM screen to all contone is a gradual transition but over a short distance, e.g. over just a few-pixel span, such as for example, 600 dpi.

It should further be appreciated that if any artifacts are created by the switching from one method to the other, such artifacts are hidden by the fact that an embodiment is actually making a fuzzy decision when the process is in the mid-range or is in mid-distance.

Parameter could be Configured

In an embodiment, a user may configure the blending parameter. For example, a user may configure the blending parameter by way of a graphical user interface or by way of setting the parameter in an ascii file. That is, the user may configure how parameters for the ramp from $D_{MAX}$=1 to $D_{MIN}$=0 looks. For example, the user may be presented with a way to select that ramp, such as for example, by way of a dialogue. The user may be provided the ability to decide just how much they want this effect to be introduced. It should be appreciated that the user may be an administrator or someone who is in charge of the printer. An example use case might be that the administrator realizes that the printing process according to an embodiment is producing undesired artifacts. Thus, by way of a configurable parameter, the administrator may adjust such blending parameter.

An Example—Scan without the Process and with the Process

An embodiment may be understood with reference to FIG. 1A and FIG. 1B. FIG. 1A is a sample output of printing two letters, G and H, in non-saturated color, according to the prior art, i.e. plain half-toning. Thus, the letters, G and H, are shown rendered with dots. It should be appreciated that top edge of G 102 and H 104, respectively, show how the prior art methodology renders an edge that appears abruptly cut-off. As well, the bottom curve of G 106 and the bottom edge of H 108 depict how the prior art methodology renders thin and possibly sparse edges.

In contrast, FIG. 1B is a sample output of printing the same two letters, G and H, in non-saturated color, according to an embodiment, i.e. half-toning with edge enhancement. As with the prior art methodology, the letters, G and H, are shown rendered with dots. However, it should be appreciated that top edge of G 110 and H 112, respectively, show how the methodology of the instant application renders a sharp, enhanced edge. As well, the bottom curve of G 114 and the bottom edge of H 116 depict how the embodiment renders sharp, enhanced edges.

Edge Detection

In an embodiment, for the system to determine the blending parameter, the system needs to know how far it is to the edge, e.g. to the background. Put another way, the system needs to know how many pixels it has to traverse from a given pixel, i.e. what distance, until white or another background color is hit. One skilled in the art would readily recognize that they are a variety of available methods to employ for edge detection.

An Exemplary Formula

In an embodiment, non-saturated colors are printed as half-tone, when the printing point is considered far from the edge, such as equal to or greater than the distance, $D_{MAX}$. When the printing process is within the distance, $D_{MAX}$, from the edge, e.g. three pixels or less from the edge, then the printing process does not render the standard way. The printing process renders a combination of the half-tone process and the contone printing process.

The degree to which the printing process renders the combination can be determined by a formula. One formula, is accordance with an embodiment, is:

$$\alpha(\text{normal half-tone way}) + (1-\alpha)(\text{the contone way}),$$

where $\alpha$ is zero at the edge and one in the middle, i.e. greater than or equal to $D_{MAX}$ from the edge.

Thus, for the example where $D_{MAX}$ is equal to three pixels from the edge, when the printing process is at 1.5 pixels from the edge, then $\alpha=\frac{1}{2}$. Then, in accordance to the formula hereinabove, $(1-\alpha)=\frac{1}{2}$. Thus, the printing prints using a combination of ½ the contone way and ½ the normal half-tone way. In an embodiment, the sum of $\alpha$ and $(1-\alpha)$ is equal to one.

Screen One and Screen Two

In an embodiment, a generalized view is contemplated. That is, instead of the printing process using a combination of contone and half-tone, the printing process may use a combination of two different types of screens, referred to herein as screen one and screen two. Thus, half-tone is an example of screen one and contone is an example of screen two.

For example, in another embodiment, screen one may be the interior, e.g. AM. While screen two, which is close to the boundary, may be FM diffusion. For the purposes of discussion herein, FM diffusion is considered a process by which the relative density of dots is manipulated.

Put another way, an embodiment provides a generalization. There may be two different screening methods. And an embodiment uses one which works well on edges and one which works well on large area of constant value. Because the embodiment optimizes a system to print both, the embodiment causes the system to use one half-tone method at the edge and one half-tone method at the interior. To prevent artifacts, the embodiment blends the methods when switching between the two methods.

What Printer Understands

It should be appreciated that, in an embodiment, during the blend phase of the printing process, the output has to be in a form that the printer understands. For instance, in pulse width modulation, the process has many bits to represent how much of the width the process has at a pixel. It should be appreciated that the embodiment does not apply for one-bit printers. Such printers may be either on or off; there is no in between. However, most printers have a variable amount of control at a pixel. Thus, the final output should be within the number of levels that that printer can accommodate. Thus, even though a user may like to have 256 levels, the printer, via the pulse width modulation or any other screen, most likely has a fewer number of levels available. Therefore, after the blend process has been determined, the actual output has to be at one of those available levels.

An Example—Specific Data

Suppose in an example of an embodiment, a user desires to print a gray value, e.g. suppose the gray value is 25 percent black. Then, a normal way of printing is half-toned. Suppose further that the printer is a black-only printer with a screen that has 175 lines per inch frequency and is a dot screen. According to the prior art, any character is likely to have jagged edges. Thus, in accordance with an embodiment, for the interior, the process leaves printing the way it is. That is, whatever the output would have been from the half-tone, the embodiment leaves the half-tone as is. As the printing process gets closer to the edge, an embodiment still takes the value that would from the normal half-toning. Essentially, the embodiment adds another screen that puts out another value. For example, the embodiment takes one minus alpha times this second screen plus alpha times the normal screen (or vice-versa depending on polarity) in, e.g. a 208-bit space, i.e. a 256-level space. Such combination renders a value that is another eight-bit value. But the printer may only print four bits. Thus, the printer has 16 levels. Further, if in the example the desired contone value was 85 out of 255, i.e. one third of the way, then the four-bit value that is sent to the printer would be five. The value sent to the printer is five because the printer has levels zero to 15, four bits. If the contone value was a little more than a third, then the embodiment might determine to send the value, six, to the printer.

Linear Interpolation as an Example of Blending

It should be appreciated that embodiments described hereinabove, where the blending parameter is $\alpha$ and the formula is $\alpha(\text{screen one}) + (1-\alpha)(\text{screen two})$, are an exemplary embodiment and is not meant to be limiting. That is, such particular formula reflects applying linear interpolation between the two extreme points, the edge and $D_{MAX}$ from the edge. It should be appreciated that other algorithms of interpolation or blending between the two boundary points may be used, in an embodiment.

Example Implementation: Saturated Text—Staircasing Effect—Anti-Aliasing

An example implementation may be the case where the printing process is printing saturated text and the edge may render a staircase effect. For example, the printing process may be printing a fully saturated color, such as black, and is printing a square or box at a 45-degree angle. The edge of top part of the box may resemble a staircase, when viewed up-close. One skilled in the art would readily recognize that one way to address such effect is to render the box at a higher resolution. Thus, at a higher resolution, the stair steps may be much smaller.

With respect to the treatment of pixels at the finer resolution, it may be desirable to have the edge cut right through a pixel. Put another way, it may be desirable to actually have that pixel half on and half off. Thus, even though a person may have asked for 100 percent text, right along some of the edge, the prior art printing process might fill in some of those staircase pixels as half on.

Thus, now one skilled in the art is back to the problem of handling non-saturated text on the edge. Someone may have gone through a standard way of handling this situation, which is known as anti-aliasing. This approach renders text that is not completely saturated. That is, it is non-saturated along the edge. And, as stated above, the normal way of handling the situation may be to half-tone the edge.

Thus, one skilled in the art would readily recognize that an embodiment as described herein may be used to ameliorate the effect of non-saturated color along the edge.

It should be appreciated that if the color happens to be saturated, then printing in accordance with an embodiment should not matter because, in this situation, screen one and screen two are both going to turn the pixel on all the way and the visual effect in not discernible.

Type of Screens

It should be appreciated that in an embodiment, for the AM screens, there are basically two types of dots. For the purposes of discussion herein, by dots is meant an aggregate of pixels. For example, the printing process is basically growing a circular type of object and making it bigger at least until about 50 percent. Perhaps, in another example, the object may become a square. As well, the white part may become a circle.

Another type of AM screen may include lines. The screens are lines that have a certain periodicity and the lines get thicker as the desired effect gets darker.

It should be appreciated that embodiment would be applicable in the cases described hereinabove.

An Exemplary Embodiment

Figure 2:
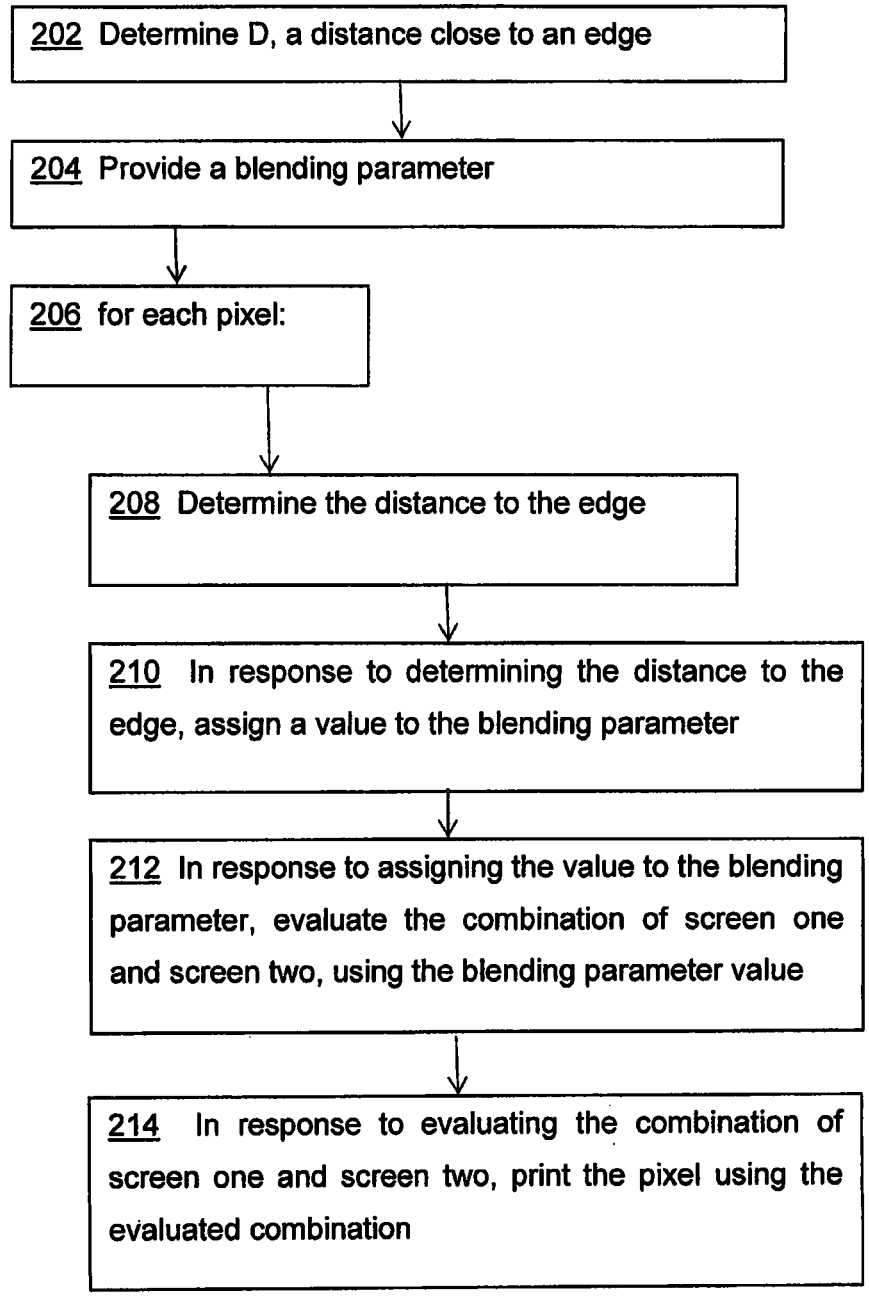
FIG. 2 is a flow chart showing fundamental steps, according to an embodiment.

An exemplary embodiment can be understood with reference to FIG. 2, a flow diagram showing the flow of fundamental steps according to an embodiment. At block 202, the distance, D, is determined. D is the distance that is considered close to the edge for the pixels that are to be printed. At block 204, the blending parameter is provided. As described in embodiments hereinabove, the blending parameter may be input or may be computed. After the D and the blending parameter are determined, the printing process begins. For each pixel (block 206), the following steps are performed. At block 208, the actual distance of the pixel to the edge is computed. At block 210, after computing the actual distance of the pixel to the edge, a corresponding value is assigned to the blending parameter. It should be appreciated that the assigned value is a constant if input by an administrator or other type of user. At block 212, once the value of the blending parameter is set, the value of the blending parameter is used to compute the combination of values contributed by screen one and separately by screen two. At block 214, after the combination of values contributed by screen one and screen two are computed, the pixel is printed. As described hereinabove, approximations to the levels of color available may be determined, or other intermediary steps may be taken, before the pixel is actually printed.

An Example Machine Overview

Figure 3:
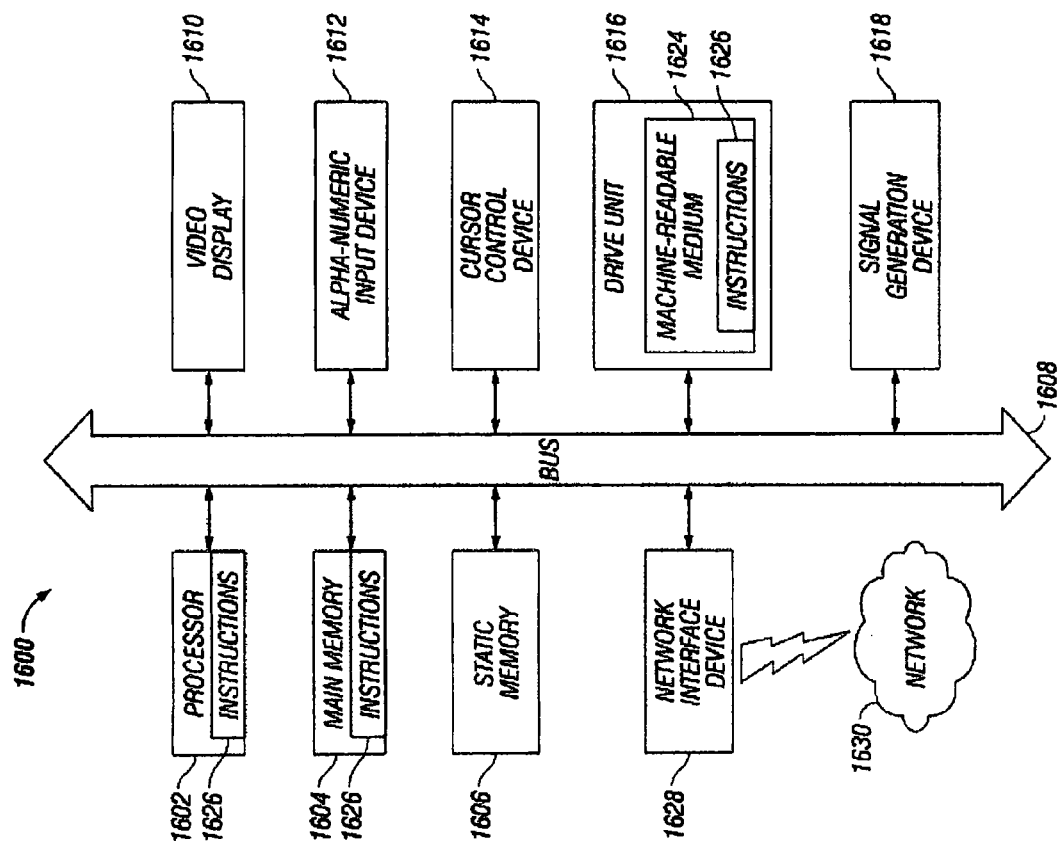
FIG. 3 is a block schematic diagram of a system in the exemplary form of a computer system according to an embodiment.

FIG. 3 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for printing non-saturated text or lines, comprising the steps of:

determining a distance, D, within which a pixel is considered close to an edge of the non-saturated text or line, wherein one end of D is referred to as $D_{Max}$ and the opposite end of D is referred to as $D_{MIN}$;

providing a blending parameter, α, that is equal to zero at $D_{MIN}$ and is equal to one at $D_{MAX}$;

for each pixel inside the non-saturated text or line:

determining a distance from the pixel inside the non-saturated text or line to the edge of the non-saturated text or line;

in response to determining that the distance is less than or equal to D from inside the non-saturated text or line to the edge, assigning a value to α that is between zero and one or equal to zero if the distance is $D_{MAX}$ or one if the distance is $D_{MIN}$;

in response to assigning the value to α, evaluating, using α, a combination of an amount of a first screen and an amount of contone; and in response to evaluating the combination, printing said pixel using said combination on an eletrophotographic printer;

wherein the steps of the method are performed by one or more computing devices.

2. The method of claim 1, wherein said first screen is an AM screen.

3. The method of claim 1, wherein the combination is:

α[the first screen]+(1−α)[the contone].

4. The method of claim 1, wherein said printing said pixel using said combination further comprises:

in response to evaluating the combination, determining an approximation of said combination to a particular level from a set of levels of color that is provided by said eletrophotographic printer.

5. The method of claim 1, wherein the blending parameter may be configured by a user and wherein said configured blending parameter overrides the step of assigning a value to α.

6. The method of claim 1, wherein the length of D is three pixels.

7. An apparatus for printing non-saturated text or lines, comprising:

at least one processor coupled to at least one memory;

said at least one processor configured for determining a distance, D, within which a pixel is considered close to an edge of the non-saturated text or line, wherein one end of D is referred to as $D_{MAX}$ and the opposite end of D is referred to as $D_{MIN}$;

said at least one processor configured for providing a blending parameter, α, that is equal to zero at $D_{MIN}$ and is equal to one at $D_{MAX}$;

said at least one processor configured for executing the following steps for each pixel inside the non-saturated text or line:

determining a distance from the pixel inside the non-saturated text or line to the edge of the non-saturated text or line;

in response to determining that the distance is less than or equal to D from inside the non-saturated text or line to the edge, assigning a value to a that is between zero and one or equal to zero if the distance is $D_{MAX}$ or one if the distance is $D_{MIN}$;

in response to assigning the value to a, evaluating, using a, a combination of an amount of a first screen and an amount of a contone; and in response to evaluating the combination, printing said pixel using said combination on an eletrophotographic printer.

8. The apparatus of claim 7, wherein said first screen is an AM screen.

9. The apparatus of claim 7, wherein the combination is:

α[the first screen]+(1−α)[the contone].

10. The apparatus of claim 7, wherein said at least one processor is further configured for:

in response to evaluating the combination, determining an approximation of said combination to a particular level from a set of levels of color that is provided by said eletrophotographic printer when printing said pixel using said combination.

11. The apparatus of claim 7, wherein the blending parameter may be configured by a user and wherein said configured blending parameter overrides the step of assigning a value to a.

12. The apparatus of claim 7, wherein the length of D is three pixels.

13. A non-transitory computer-readable storage medium storing one or more sequences of instructions for printing non-saturated text or lines, which instructions, when executed by one or more processors, cause the one or more processors to carry out the steps of:

determining a distance, D, within which a pixel is considered close to an edge of the non-saturated text or line, wherein one end of D is referred to as $D_{MAX}$ and the opposite end of D is referred to as $D_{MIN}$;

providing a blending parameter, α, that is equal to zero at $D_{MIN}$ and is equal to one at $D_{MAX}$;

for each pixel inside the non-saturated text or line:

determining a distance from the pixel inside the non-saturated text or line to the edge of the non-saturated text or line;

in response to determining that the distance is less than or equal to D from inside the non-saturated text or line to the edge, assigning a value to α that is between zero and one or equal to zero if the distance is $D_{MAX}$ or one if the distance is $D_{MIN}$;

in response to assigning the value to α, evaluating, using α, a combination of an amount of a first screen and an amount of a contone; and in response to evaluating the combination, printing said pixel using said combination on an eletrophotographic printer.

14. The non-transitory computer-readable storage medium of claim 13, wherein said first screen is an AM screen.

15. The non-transitory computer-readable storage medium of claim 13, wherein the combination is:

α[the first screen]+(1−α)[the contone].

16. The non-transitory computer-readable storage medium of claim 13, further causing the one or more processors to carry out the steps of:

in response to evaluating the combination, determining an approximation of said combination to a particular level from a set of levels of color that is provided by said eletrophotographic printer, when printing said pixel using said combination.

17. The non-transitory computer-readable storage medium of claim 13, wherein the blending parameter may be configured by a user and wherein said configured blending parameter overrides the step of assigning a value to α.

18. The non-transitory computer-readable storage medium of claim 13, wherein the length of D is three pixels.

* * * * *